Jan. 20, 1959    E. M. ROBERTSON ET AL    2,870,011
PHOTOSENSITIZATION OF VINYLAZIDOPHTHALATE POLYMERS
Filed Jan. 18, 1957
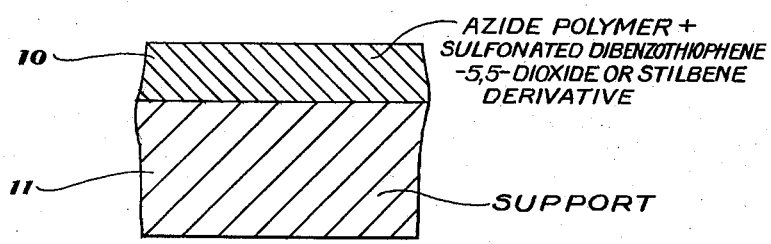
*Earl M. Robertson*
*James A. Van Allan*
INVENTORS
BY
ATTORNEY & AGENT

United States Patent Office 2,870,011
Patented Jan. 20, 1959

2,870,011

PHOTOSENSITIZATION OF VINYLAZIDO-PHTHALATE POLYMERS

Earl M. Robertson and James A. Van Allan, Rochester, N. Y., assignors to Eastman Kodak Company, Rochester, N. Y., a corporation of New Jersey Application January 18, 1957, Serial No. 634,899

7 Claims. (Cl. 96—91)

This invention relates to the photosensitization of inherently light-sensitive polymers containing recurring units to which are attached azide groups and more particularly to the photo-sensitization of such polymers containing recurring vinylazidohydrogenphthalate groups.

In the Merrill et al. U. S. patent application, Serial No. 525,271, filed July 12, 1955, are described various inherently light-sensitive polymers to the recurring units of which are attached azide groups. Representative azide polymers described in that invention contain the following recurring polymeric units:

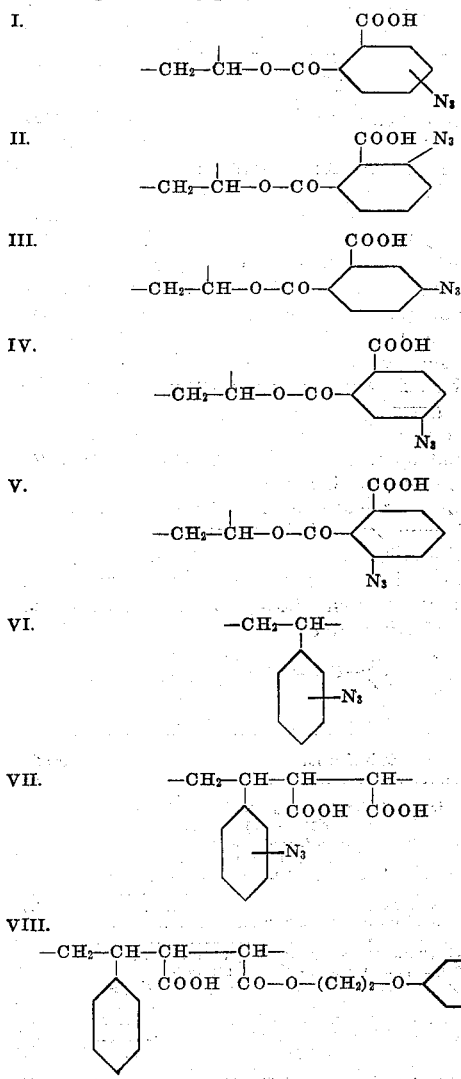

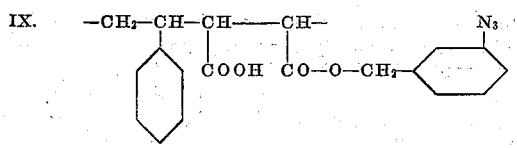

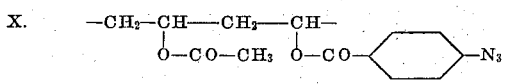

In this polymer X the azide units may constitute as little as 5 percent and as high as 90 to 100 percent of the recurring units of the polymer chain.

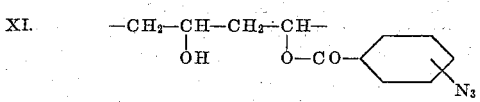

The vinyl alcohol units of this polymer may constitute from 0 to about 90 to 95 percent of the recurring units of the polymer chain.

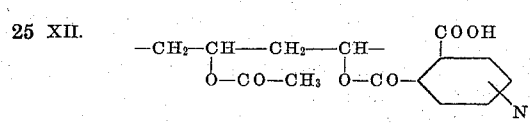

in which the vinyl acetate units constitute 0 to about 80–90 percent of the recurring polymeric units.

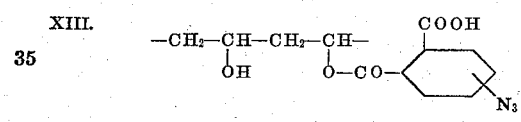

in which the vinyl alcohol units constitute about 5 to 95 percent of the recurring polymeric units.

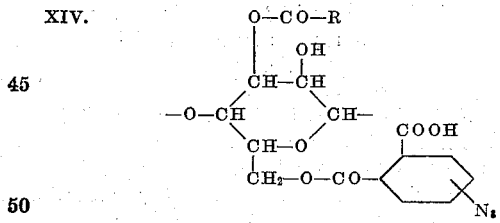

in which R is a lower alkyl group of preferably 1 to 4 carbon atoms as in an azidophthalic acid ester of a partially hydrolyzed cellulose acetate which contained about 16 to 35 percent acetyl. Hydroxyl groups of the cellulose nucleus may also be esterified with organic acids such as acetic and the azidobenzoic and azidophthalic acids.

XV. Azido phthalamides of amino containing proteins and polymers such as the 3-azidophthalamide of gelatin.

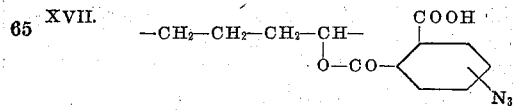

in which the vinyl azidophthalate units constitute from about 5 to 80 percent or more of the recurring units of the polymer.

XVIII. 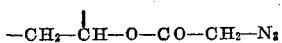

The vinylazidohydrogenphthalate polymers with which the invention is particularly concerned possess recurring units of Formulas I–IV, XII, XIII and XVII above. A very useful group of these vinylazidophthalate polymers possess both vinyl acetate and vinylazidophthalate units as shown in Formula XII above wherein the vinylacetate groups preferably comprise about 50 to 65 mole percent of the polymer units and the vinylazidophthalate units about 30 to 35 mole percent. In addition, a small amount of vinyl alcohol units of the order of 0 to 10 mole percent may be present. However, a minimum of vinyl alcohol units is desired for most applications of the light-sensitive polymers in order to insure maximum hydrophobic properties in the polymer. Also, the indicated proportion of the vinylacetate units are desired to improve the hydrophobic properties. The polymers have sufficient light sensitivity if they contain about 30 to 35 mole percent of the vinylazidophthalate units and this proportion also insures alkali solubility which is a desirable property of the polymers since aqueous solutions may be used for coating and processing the polymers. However, very useful vinylacetate-vinylazidophthalate polymers contain much less than 30 mole percent of vinylazidophthalate units and can be sensitized with the organic compounds described hereinafter. The preparation of these polymers is described in the mentioned Merrill et al. invention and in more detail in the Merrill et al. U. S. patent application Serial No. 525,368 filed July 29, 1955.

The azide polymers are of particular use in photomechanical processes described in the mentioned Merrill et al. inventions according to which a layer of the polymer on a support such as an aluminum plate is exposed to light under a pattern until the exposed area has become insoluble in a solvent for the original polymer such as water, alkali or organic solvent. Thereafter treatment with the solvent removes the unexposed polymer leaving a resist image on the support suitable for further use, for example, in making printing plates.

We have now discovered that the indicated azide polymers can be sensitized with certain dibenzothiophene-5,5-dioxide and stilbene compounds so as to materially decrease the amount of exposure to light required to locally insolubilize the polymer on the support.

One object of the invention is therefore to provide organic compounds useful for increasing the light sensitivity of the azide polymers. Another object is to provide light-sensitive compositions containing the azide polymers as sensitizing agents. Other objects of the invention will become apparent from the following detailed description of the invention:

In the accompanying drawing is shown in greatly enlarged cross-sectional view the appearance of a representative photographic element provided with a layer of the photosensitive composition of the invention. In the drawing layer 10 of the element represents a support such as paper, metal, synthetic polymer and the like, having adhered thereto a layer 11 comprising a mixture of azide polymer and dibenzothiophene-5,5-dioxide or sulfonated stilbene derivative sensitizing agent.

The sensitizing agents of the invention which can be employed with the azide polymers to increase their light sensitivity are tabulated hereinafter. These sensitizing agents are particularly useful with the vinylacetate-vinylazilophthalate copolymers containing a minimum of vinyl alcohol units as described above.

(1) Dibenzothiophene-5,5-dioxide disulfonic acid salts having the following formula wherein the substituents are present in the positions indicated in the following table:

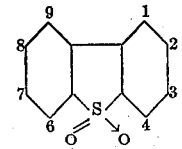

| Substitution | Speed |
| --- | --- |
| 1,9-disodiumsulfo-2,8-dimethoxy-3,7-bis(o-methoxy-benzamido)- | 140 |
| 1,9-disodiumsulfo-2,8-dimethoxy-3,7-bis(benzamido)- | 450 |
| 1,9-disodiumsulfo-2,8-dimethoxy-3,7-bis(tosylamino)- | 450 |
| 1,9-disodiumsulfo-2,8-dimethoxy-3,7-bis(β-hydroxyethylamino)- | 450 |
| 1,9-disodiumsulfo-2,8-dimethoxy-3,7-bis(p-methoxybenzamido)- | 550 |
| 1,9-disodiumsulfo-2,8-dimethoxy-3,7-bis(acetamido)- | 550 |
| 1,9-disodiumsulfo-2,8-dimethoxy-3,7-bis(2,4-dimethoxybenzamido)- | 450 |
| 1,9-disodiumsulfo-2,8-dimethoxy-3,7-bis(p-nitrobenzamido)- | 65 |
| 3,7-bis(tosylamino)-2,8-disodium sulfo- | 140 |
| 3,7-bis(phenoxyacetamido)-2,8-disodium sulfo- | 65 |
| 3,7-bis(o-methoxybenzamido)2,8-disodium sulfo- | 50 |
| 3,7-bis(2,4-dimorpholino-s-triazinylamino)-2,8-disodium sulfo- | 130 |
| 3,7-bis(2,4-diethanolamino-s-triazinylamino)-2,8-disodium sulfo- | 90 |
| 3,7-bis(4-ethoxy-3-sulfobenzamido)-2,8-disodium sulfo- | 100 |
| 3,7-bis(p-tolylamino)-2,8-disodium sulfo- | 200 |
| 3,7-bis(m-phenthoylamino)-2,8-disodium sulfo- | 180 |
| 3,7-bis-(2-thenylamino)-2,8-disodium sulfo- | 65 |
| 3,7-bis(p-methoxybenzamido)-2,8-disodium sulfo- | 65 |
| 3,7-bis(4-methyl-2-methoxybenzamido)-2,8-disodium sulfo- | 90 |
| 3,7-bis(1-naphthoylamino)-2,8-disodium sulfo- | 250 |
| 3,7-bis(4-methoxy-3-sulfobenzamido)-2,8-disodium sulfo- | 180 |
| 3,7-bis(2-ethoxybenzamido)-2,8-disodium sulfo- | 700 |
| 3,7-bis(phenylbenzamido)-2,8-disodium sulfo- | 70 |
| 3,7-bis(2,4-diethoxybenzylamino)-2,8-disodium sulfo- | 250 |
| 3,7-bis(2,4-dimethoxybenzamido)-2,8-disodium sulfo- | 250 |
| 3-(4-sulfophenyl)-7-sulfo-2,8-disodium sulfo- | 200 |

The relative speed values opposite each sensitizing compound in the above table and the speed values of each of the compounds shown in the following tables were obtained by dissolving 0.75 gram of a vinylacetate-vinylazidophthalate polymer of formula XII above containing about 50 mole percent of vinylacetate units, 40 mole percent of vinylazidophthalate units and 10 mole percent vinyl alcohol units, in 98 cc. of water to which had been added 2 cc. of 28 percent aqueous ammonium hydroxide solution. Then 0.075-gram of the particular sensitizing compound was added and the dope coated upon a grained aluminum plate, exposed under glass to a photographic step tablet and the unexposed polymer washed off with 0.5 percent aqueous ammonium hydroxide solution. After dyeing the image remaining on the plate, a speed value was calculated for the sensitizing agent dependent upon the number of visible steps comprising the dyed image. Upon this scale, the unsensitized polymer has a speed value of 45 and under comparable conditions of exposure a fully esterified cinnamic acid ester of polyvinyl-alcohol has a speed value of 1.0.

(2) Triazinylamino stilbenesulfonic acids having the following formula wherein the nuclei are substituted as shown in the following table:

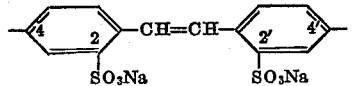

| Substitution | Speed |
| --- | --- |
| 4,4'-bis(2,4-di-β-hydroxyethylamino sym-triazinylamino)- | 350 |
| 4,4'-bis[di-(4-sulfoanilino)]-sym-triazinylamino)- | 100 |
| 4,4'-bis[di (diethylamino)]-sym-triazinylamino)- | 140 |
| 4,4'-bis(2-phenoxy-4-dimethylamino-sym-triazinylamino)- | 140 |
| 4,4'-bis(2-p-sulfophenoxy-4-dimethyl-aminosym-triazinylamino)- | 400 |
| 4,4'-bis(di-n-propylaminosym-triazinylamino)- | 200 |
| 4,4'-bis(2-phenoxy-4-anilinosym-triazinylamino)- | 650 |
| 4,4'-bis(dihydroxysym-triazinyl-amino)- | 50 |
| 4,4'-bis(2-anilino-4-ethanolaminosym-triazinylamino)- | 550 |
| 4,4'-bis(di-p-methylsulfonamidosym-triazinylamino)- | 180 |
| 4,4'-bis(2-p-methylsulfonamido-4-morpholinosym-triazinylamino)- | 250 |
| 4,4'-bis(di-p-toluidinosym-triazinylamino)- | 400 |
| 4,4'-bis(di-γ-hydroxypropylaminosym-triazinylamino)- | 800 |
| 4,4'-bis(dianilinosym-triazinylamino)- | 140 |

(3) Triazinylamino stilbenesulfonic acids having the following formula wherein the nuclear substituents R and R' are as shown in the following table:

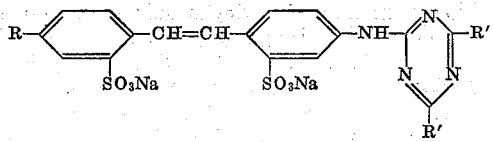

| R | R' | Speed |
|---|---|---|
| Amino | Anilino | 280 |
| Acetamido | Amino | 280 |
| Do | Ethanol amino | 200 |
| Do | Morpholino | 140 |
| Do | Piperidino | 400 |
| Tosyl | Anilino | 280 |
| Phenoxyacetyl | Amino | 200 |
| p-Acetamidobenzene-sulfonyl | do | 200 |

(4) Aminostilbenesulfonic acids

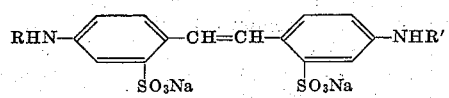

wherein R and R' are as shown in the following table:

| R | R' | Speed |
|---|---|---|
| Benzoyl | Benzoyl | 200 |
| 2-Methoxybenzoyl | 2-Methoxybenzoyl | 70 |
| Tosyl | Tosyl | 200 |
| Phenoxyacetyl | do | 280 |

(5) Aminostyrylstilbenes

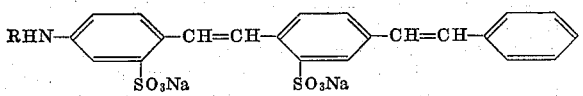

| R | Speed |
|---|---|
| 2,4-Dipiperidine-s-triazine | 400 |
| Tosyl | 250 |
| Phenoxyacetyl | 280 |

(6) Aminodistyrylbenzenedisulfonic acids

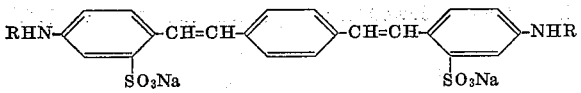

| R | Speed |
|---|---|
| Diethanolamino-s-triazinyl | 100 |
| Acetyl | 220 |
| Phenoxyacetyl | 200 |

The stilbene compounds of types 2 to 6 can therefore be assigned the general formula

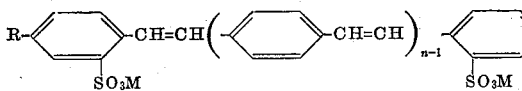

wherein R represents either an amino, triazinylamino, acyl or acylamido group, R' represents either a triazinylamino, styryl, acyl or acylamido group, $n$ represents a positive integer of from 1 to 2 and M represents an alkali metal.

The other azide polymers described above can be sensitized in a similar manner with sensitizing agents of types 1 to 6 shown above used alone or in admixture with each other.

A useful quantity of the sensitizing agent to use is 10 percent of the weight of polymer present in the light-sensitive composition.

It will be understood that the photomechanical resist compositions of the invention include a mixture of the azide polymer and sensitizing agent in any form including a dry mixture of chemicals, a solvent solution or a mixture as present in a supported or unsupported film containing the polymer and sensitizing agent.

The stilbene derivatives of types 2, 3, 4 and 5 are similar in structure to diazido stilbene disulfonic acids previously known to behave as sensitizing agents for organic colloid coatings. That is, the familiar diazido stilbene disulfonic acid such as

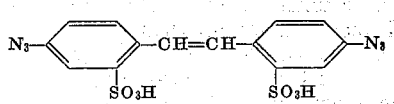

are inherently light sensitive and become insoluble upon exposure to light and have been employed in organic colloid layers to form insoluble relief images on various supports. However, these diazido stilbene disulfonic acids tend to decompose upon storage for moderate periods of time particularly when storage is carried out under adverse conditions of temperature and humidity. This property renders the compounds much less suitable for use in sensitizing the azide polymers of the invention than are the dibenzothiophene dioxide and stilbene derivative sensitizing agents described above. Moreover, the previously known diazido stilbene compounds such as that given above in general are less effective in increasing the light sensitivity of the azide polymers of the present invention. For example, the compound above, 4,4'-diazidostilbene-2,2'-disulfonic acid disodium salt imparted a speed of 140 to the same vinylacetate-vinylazidophthalate polymer as used in evaluating the sensitizing agents of the invention.

In the present investigation carried out in an endeavor to discover the best sensitizing agents for the azide polymers, a large number of seemingly unrelated compounds were found to increase the light sensitivity of the azide polymers but were generally not as effective as sensitizing agents as were the dibenzothiophene dioxide and stilbene derivative sensitizers of types 1 to 6 above. The following compounds materially increased the light sensitivity of the mentioned vinylacetate-vinylazide phthalate polymer and can be expected to sensitize the other azide polymers described above to a similar extent.

2-hydrazinobenzothiazole
3-aminophthalhydrazide
1,3-diphenyl-5-(p-hydroxyphenyl)-2-pyrazoline
1,4-diphenyl-3-(p-hydroxyphenyl)-2-pyrazoline
5-anisyl-1,3-diphenyl-2-pyrazoline
1-(p-sulfophenyl)-3,4-diphenylpyrazoline
2,6-diaminopyridine hydrochloride
2,6-diaminoacridine sulfate
Cysteine hydrochloride
3-amino-6-methyl-5-phenyl-1,2,4-triazabenzene
3-aminophthalic acid
3-aminophthalic acid sodium salt
Quaternary salt of polyvinyl besylate with 2-amino-6-methylpyridine
1,2-diphenylhydroxy-1,2,4-triazine
Disalicylalacetone
1-naphthylhydrazine-4,8-disulfonic acid
2-hydrazinobenzoxazole
1-(4-sulfophenyl)-3,5-diphenylpyrazoline
Disulfo-1,3,5-triphenylpyrazoline
1-phenyl-3-(4-sulfophenyl)pyrazoline
2-hydrazino-4-methylquinolin
1-hydroxy-2-naphthylhydrazide
Thiophene-2-carbohydrazide
4-methylumbelliferone
1,6-dihydroxy-2,4-hexadiyne
2-methyl-3-(p-dimethylaminostyryl)-quinoxalinium ethiodide
2,3-dimethylquinoxaline monohydrate
1-methylquinoxalinium perchlorate 1-methylquinolinium iodide
2,3-dimethylquinoxaline ethiodide The light-sensitive compositions of the invention comprising azide polymer and sensitizing agent can be used in the various ways disclosed in the mentioned Merrill et al. inventions to obtain photographic reproductions. In general, a layer of the sensitized polymer on a support is exposed under a pattern to render it locally insoluble. Thereafter, an insoluble relief image is developed on the support with a suitable solvent followed by other operations well known in the art such as etching the metal support through the resist image to provide a printing plate. Examples 1 to 19 of the Merrill et al. U. S. patent application Serial No. 525,271 filed July 29, 1955, illustrates such usages and include the preparation of lithographic printing plates, electrically conducting images, sandblast resists and colored reproductions.

The dibenzothiophene dioxides of type 1 were prepared as described in U. S. Patent 2,563,493 and British Patent 678,291; type 2 compounds as described in British Patents 678,291, 624,052 and elsewhere; type 3 as in British Patents 654,028 and 654,779; type 4 as in U. S. Patent 2,468,431; type 5 as in British Patent 668,198, followed by reduction of the nitro group and acylation in the usual manner or treatment with cyanuric chloride and an amine to obtain the s-triazine derivatives; type 6 as in British 668,199 and 668,200 followed by acylation or treatment with cyanuric chloride and an amine to obtain the s-triazine compound.

What we claim is:

1. A light-sensitive photomechanical resist composition comprising a mixture of a vinylazidohydrogenphthalate polymer and as a sensitizing agent a member of the class consisting of (1) a dibenzothiophene-5,5-dioxide disulfonic acid salt, and (2) a compound having the general structure

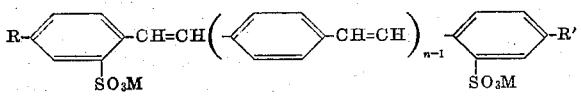

wherein R represents a member of the class consisting of amino, triazinylamino, acyl and acylamido groups, R' represents a member of the class consisting of triazinylamino, styryl, acyl and acylamido groups, $n$ represents a positive integer of from 1 to 2, and M represents an alkali metal.

2. The composition of claim 1 wherein the polymer is a vinyl acetate-vinylazidohydrogenphthalate copolymer.

3. A light-sensitive photomechanical resist composition comprising a mixture of a vinylazidohydrogenphthalate polymer and as a sensitizing agent a member of the class consisting of 1,9-disodiumsulfo-2,8-dimethoxy-3,7-bis-(benzamido) - dibenzothiophene - 5,5 - dioxide, 1,9 - disodiumsulfo - 2,8 - dimethoxy - 3,7 - bis(toluenesulfonamido) - diibenzothiophene - 5,5 - dioxide, 1,9 - disodiumsulfo - 2,8 - dimethoxy - 3,7 - ($\beta$ - hydroxyethylamino) - dibenzothiophene - 5,5 - dioxide, 1,9 - disodiumsulfo - 2,8 - dimethoxy - 3,7 - bis(p - methoxybenzamido) - dibenzothiophene - 5,5 - dioxide, 1,9 - disodiumsulfo - 2,8 - dimethoxy - 3,7 - bis(acetamido) - dibenzothiophene - 5,5 - dioxide, 1,9 - disodiumsulfo - 2,8 - dimethoxy - 3,7 - bis(2,4 - dimethoxybenzamido) - dibenzothiophene - 5,5 - dioxide, 3,7 - bis(2 - ethoxybenzamido) - 2,8 - disodium sulfodibenzothiophene - 5,5 - dioxide, 4,4' - bis(2,4 - di - $\beta$ - hydroxyethylamino - sym - triazinylamino) - 2,2' - disodium sulfostilbene, 4,4' - bis(2 - p - sulfophenoxy - 4 - dimethylamino - sym - triazinylamino) - 2,2' - disodium sulfostilbene, 4,4' - bis(2 - phenoxy - 4 - anilino - sym - triazinylamino) - 2,2' - disodium sulfostilbene, 4,4' - bis(2 - anilino - 4 - ethanolamino - sym - triazinylamino) - 2,2' - disodium sulfostilbene, 4,4' - bis(di - $\gamma$ - hydroxypropylamino - sym - triazinylamino) - 2,2' - disodium sulfostilbene, and 4 - acetamido - 4' - sym - piperidinotriazinylamino - 2,2'-disodium sulfostilbene.

4. The composition of claim 3 wherein the polymer is a vinyl acetate-vinylazidohydrogenphthalate copolymer.

5. A light-sensitive photomechanical resist composition comprising a mixture of a vinylazidohydrogenphthalate polymer and a dibenzothiophene-5,5-dioxide disulfonic acid salt.

6. A light-sensitive photomechanical resist composition comprising a mixture of a vinylazidohydrogenphthalate polymer and a triazinylamino-2,2'-disodium sulfostilbene.

7. A light-sensitive photomechanical resist composition comprising a mixture of a vinylazidohydrogenphthalate polymer and a 4,4'-diacylamido-2,2'-disodium sulfostilbene.

References Cited in the file of this patent
UNITED STATES PATENTS
2,714,066    Jewett et al. _____ July 26, 1955